(12) United States Patent
Panavich et al.

(10) Patent No.: US 12,436,890 B2
(45) Date of Patent: Oct. 7, 2025

(54) SNOOP FILTER WITH DISAGGREGATED VECTOR TABLE

(71) Applicant: Microsoft Technology Licensing, LLC, Redmond, WA (US)

(72) Inventors: Jason Lawrence Panavich, Raleigh, NC (US); Eric Francis Robinson, Raleigh, NC (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 181 days.

(21) Appl. No.: 18/336,694

(22) Filed: Jun. 16, 2023

(65) Prior Publication Data

US 2024/0419594 A1    Dec. 19, 2024

(51) Int. Cl.
G06F 12/0817    (2016.01)

(52) U.S. Cl.
CPC .... G06F 12/0828 (2013.01); *G06F 2212/621* (2013.01)

(58) Field of Classification Search
CPC ............. G06F 12/0828; G06F 12/0831; G06F 12/0833; G06F 2212/1044; G06F 2212/621
See application file for complete search history.

(56) References Cited

U.S. PATENT DOCUMENTS

| | | | |
|---|---|---|---|
| 6,631,447 B1 | 10/2003 | Morioka et al. | |
| 9,223,711 B2 | 12/2015 | Philip | |
| 10,592,424 B2 | 3/2020 | Beard | |
| 10,657,055 B1 | 5/2020 | Jalal | |
| 11,550,720 B2 * | 1/2023 | Ramagiri | G06F 12/0833 |
| 2002/0124144 A1 | 9/2002 | Gharachorloo | |
| 2008/0147988 A1 | 6/2008 | Heller et al. | |
| 2008/0209133 A1 | 8/2008 | Ozer | |
| 2014/0052905 A1 | 2/2014 | Lih | |
| 2015/0012719 A1 | 1/2015 | Tune | |

(Continued)

FOREIGN PATENT DOCUMENTS

WO    2017155659 A1    9/2017

OTHER PUBLICATIONS

Final Office Action mailed on Dec. 11, 2024, in U.S. Appl. No. 18/325,863, 13 pages.

(Continued)

*Primary Examiner* — Larry T Mackall
(74) *Attorney, Agent, or Firm* — Seed Intellectual Property Law Group LLP

(57) ABSTRACT

The described technology provides a method including receiving a request from an agent for accessing a cogran and for allocating an agent ID to one of a plurality of SFT entries in a snoop filter (SFT), performing a tag lookup function for a tag of the cogran in the SFT to find a matched SFT entry, wherein the matched SFT entry is tracking the tag of the cogran, determining the number n of agents being tracked by the matched SFT entry, and in response to determining that the number n of agents being tracked by the matched entry is above a threshold, storing a DVT index in the tracking-_info field of the matched SFT entry, wherein the DVT index selects a DVT entry in a disaggregated vector table (DVT), wherein the selected DVT entry is configured to hold a tracking vector for tracking the agents that have cached the cogran for the matched SFT entry.

17 Claims, 10 Drawing Sheets

(56) References Cited

U.S. PATENT DOCUMENTS

| | | |
|---|---|---|
| 2016/0062890 A1 | 3/2016 | Salisbury |
| 2016/0062893 A1 | 3/2016 | Tune |
| 2016/0117249 A1 | 4/2016 | Lin |
| 2017/0255557 A1 | 9/2017 | Robinson |
| 2017/0286299 A1 | 10/2017 | Sury |
| 2019/0073304 A1 | 3/2019 | Jiang |
| 2020/0042446 A1 | 2/2020 | Mittal |
| 2020/0218657 A1 | 7/2020 | Forrest |
| 2020/0250098 A1 | 8/2020 | Ma |
| 2021/0294743 A1 | 9/2021 | Randall |
| 2022/0100672 A1 | 3/2022 | Apte |
| 2022/0164288 A1 | 5/2022 | Ramagiri |
| 2022/0308999 A1 | 9/2022 | Randall |
| 2023/0100746 A1 | 3/2023 | Loison |
| 2023/0139212 A1 | 5/2023 | Randall |
| 2024/0403218 A1 | 12/2024 | Robinson |
| 2024/0403219 A1 | 12/2024 | Kaseridis |
| 2024/0419593 A1 | 12/2024 | Ramakrishna |
| 2024/0427703 A1 | 12/2024 | Robinson |

OTHER PUBLICATIONS

A. Moshovos, "RegionScout: Exploiting Coarse Grain Sharing in Snoop-Based Coherence", 32nd International Symposium on Computer Architecture (ISCA'05)—IEEE, Jun. 4, 2005, pp. 234-245.

Ehsan Atoofian, "Adaptive Snoop Granularity and Transactional Snoop Filtering in Hardware Transactional Memory", Canadian Journal of Electrical and Computer Engineering—IEEE, vol. 37, Issue 2, 2014, pp. 76-85.

International Search Report and Written Opinion received for PCT Application No. PCT/US2024/029558, Aug. 30, 2024, 15 pages.

International Search Report and Written Opinion received for PCT Application No. PCT/US2024/030161, Jul. 24, 2024, 12 pages.

Moshovos, et al., "JETTY: filtering snoops for reduced energy consumption in SMP servers", Proceedings HPCA Seventh International Symposium on High-Performance Computer Architecture—IEEE, Jan. 19, 2001, pp. 85-96.

Non-Final Office Action mailed on Jul. 8, 2024, in U.S. Appl. No. 18/326,147, 12 pages.

Non-Final Office Action mailed on Jun. 10, 2024, in U.S. Appl. No. 18/325,863, 13 pages.

Notice of Allowance mailed on Aug. 27, 2024, in U.S. Appl. No. 18/340,359, 08 pages.

Zebchuk, et al., "Multi-grain coherence directories", MICRO-46: Proceedings of the 46th Annual IEEE/ACM International Symposium on Microarchitecture, Dec. 7, 2013, pp. 359-370.

International Search Report and Written Opinion received for PCT Application No. PCT/US2024/033323, Oct. 11, 2024, 11 pages.

International Search Report and Written Opinion received for PCT Application No. PCT/US2024/033480, Sep. 10, 2024, 15 pages.

International Search Report and Written Opinion received for PCT Application No. PCT/US2024/034880, Oct. 14, 2024, 14 pages.

Non Final Office Action mailed on Sep. 26, 2024, in U.S. Appl. No. 18/336,637, 09 pages.

Notice of Allowance mailed on Dec. 5, 2024, in U.S. Appl. No. 18/340,359, 2 pages.

Notice of Allowance mailed on Oct. 23, 2024, in U.S. Appl. No. 18/326,147, 9 pages.

Notice of Allowance mailed on Feb. 14, 2025, in U.S. Appl. No. 18/336,637 10 pages.

Notice of Allowance mailed on Apr. 28, 2025, in U.S. Appl. No. 18/325,863, 8 pages.

Notice of Allowance mailed on Feb. 10, 2025, in U.S. Appl. No. 18/326,147, 05 pages.

Notice of Allowance mailed on Feb. 13, 2025, in U.S. Appl. No. 18/340,359, 05 pages.

* cited by examiner

SNOOP FILTER WITH DISAGGREGATED VECTOR TABLE

BACKGROUND

A processor-based device may include multiple processing elements (PEs) (e.g., processor cores, as a non-limiting example) that each provide one or more local caches for storing frequently accessed data. Because the multiple PEs of the processor-based device may share a memory resource such as a system memory, multiple copies of shared data read from a given memory address may exist at the same time within the system memory and within the local caches of the PEs. Thus, to ensure that all of the PEs have a consistent view of the shared data, the processor-based device provides support for a cache coherence protocol to enable local changes to the shared data within one PE to be propagated to other PEs.

SUMMARY

The described technology provides a method including receiving a request from an agent for accessing a cogran and for allocating an agent ID to one of a plurality of SFT entries in a snoop filter (SFT), performing a tag lookup function for a tag of the cogran in the SFT to find a matched SFT entry, wherein the matched SFT entry is tracking the tag of the cogran, determining the number n of agents being tracked by the matched SFT entry, and in response to determining that the number n of agents being tracked by the matched entry is above a threshold, storing a DVT index in the tracking-_info field of the matched SFT entry, wherein the DVT index selects a DVT entry in a disaggregated vector table (DVT), wherein the selected DVT entry is configured to hold a tracking vector for tracking the agents that have cached the cogran for the matched SFT entry.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

DETAILED DESCRIPTIONS

Figure 1:
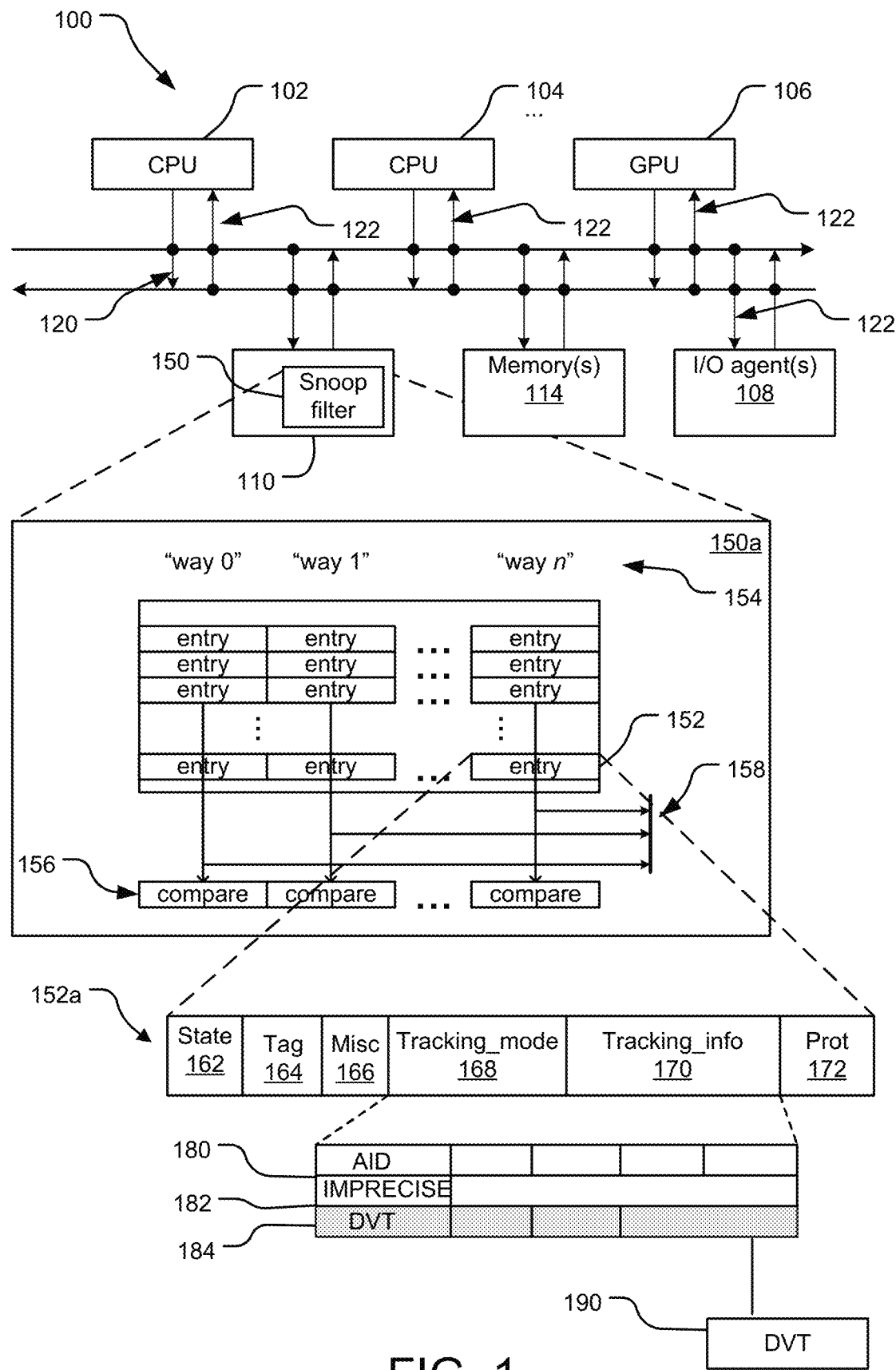
FIG. 1 illustrates an implementation of a system providing cache coherence using snoop filters.

Implementations disclosed herein disclose multi-processor systems that employ hardware (HW)-enforced cache coherency in which when an agent, such as a CPU, a GPU, etc., wants to access a memory location, HW automatically determines whether another agent currently holds a copy of that memory location. If the access is a read and the memory location is cached by another agent, system memory might be stale, in which case the access must be satisfied by obtaining the data from the other agent's cache. If the access is a write, then any cached copy that has been modified must be first written back to system memory or be overwritten/merged with the data of the write. The memory block for which HW-enforced cache coherency is maintained is called a coherence granule (cogran) and system may match its cogran size to the cache line size.

In some implementations, the system may maintain a list of which cograns are currently cached by which agents. In other implementations, there may be no central coherence directory that needs to be maintained, and instead, during the course of handling the requested memory access, all agents are queried to determine whether any holds a copy of the cogran in their cache. This query is commonly referred to as a snoop. An over-snoop condition occurs when an agent is snooped to search for a cogran in its cache and that agent does not currently hold a copy of that cogran. Over-snooping is functionally useless and unnecessarily perturbs that agent. A system disclosed herein discloses advantageous implementations using a snoop filter (SFT) to help reduce over-snooping. Such implementations reduce over-snooping penalties in terms of latency added to the memory access, interconnect bandwidth consumed for no functional benefit, and energy wasted to perform unnecessary cache lookup(s) at the agents that are over-snooped. A snoop filter may be thought of as a higher-level, inclusive, set-associative cache that has no data and whose purpose is to track the entire set of cograns held by the lower-level cache(s) for which cache coherence needs to be maintained.

An imprecise snoop filter is a filter that tracks that a cogran has been cached by some agent at some point. The tracking overhead of an imprecise SFT is smaller than other types but the lack of precision means that when a snoop needs to be sent, over-snooping is likely to occur. The lack of precision also means that the SFT generally loses the ability to detect when the cogran has been evicted from all the coherent caches.

A precise snoop filter may employ a vector to track exactly which agents have cached a copy of a cogran. The tracking overhead of a precise SFT can require a relatively large amount of area to implement because it includes 1 bit per agent per cogran tracked. In this implementation, when an agent obtains a copy of a cogran to write into its cache, the agent's corresponding vector bit in the SFT entry tracking that cogran is set. When the agent later evicts the cogran, its corresponding vector bit in the SFT entry tracking that cogran is cleared. This has a couple of advantages over the imprecise SFT: (a) only the exact agents that need to be snooped will be snooped; (b) the snoop scope can be further reduced over time as individual agents evict the cogran from their caches and the SFT is updated accordingly, this applies only to evictions that the agents communicate to the SFT.

In a hybrid implementation an SFT may track precisely (n) agents (typically, 2-3) for each cogran by recording their agent ID (AID) in the SFT entry's tracking information. The AID may be a unique identifier for each agent that the SFT tracks. For example, the AID could be an encode of the SFT vector position that agent may otherwise set. Alternatively, the AID may be the agent's interconnect address—the ID used by the interconnect to send messages to that agent. When >(n) agents have cached a copy of the cogran, the SFT switches from AID-tracking to imprecise-tracking. When the hybrid implementation is in an AID-tracking mode, there are no over-snoops because the SFT entry knows exactly whom to snoop. On the other hand, when the hybrid implementation is in an imprecise-tracking mode, the SFT entry indicates that all agents need to be snooped if the cogran is currently held, or tracked, by the SFT. When the system has many coherent agents (e.g., 128), this approach employs less HW than the precise vector SFT-recording a (n) AIDs (for a small enough n) require fewer state bits than a large vector.

In a system with many coherent agents (e.g., 128) the over-snooping due to imprecise tracking is very costly in terms of fabric bandwidth consumed and energy wasted. Furthermore, the larger SFT needed for precise tracking is very costly in terms of area which also causes snoop (and other) message travel distances to grow. Workloads with many shared data structures or shared instruction pages may quickly exhaust the precise-AID tracking ability of the hybrid approach and may lead to the imprecise tracking mode being used more often. While some amount of over-snooping may be tolerated because the various imprecise tracking modes generally don't have the ability to recover back to precise tracking as cograns are evicted, the snoop filter management itself incurs an over-snooping overhead. Specifically, when the snoop filter is unable to know which cograns are no longer cached by any agents, the snoop filter may more frequently send "filter flush" snoops to make room in the SFT itself so that it may install a newly tracked cogran in the SFT.

FIG. 1 discloses an implementation of a cache coherence system 100 using snoop filters that improves upon one or more of the above implementations. Specifically, the cache coherence system 100 may be implemented on a multi-core architecture that includes a number of central processing unit (CPU) cores, 102 and 104, a graphical processing unit (GPU) 106, one or more input/output (I/O) agents 108, a point of serialization (POS) 110, and a memory 114. Although the present example shows two CPU cores and one GPU, it is understood that any number of CPU cores and CPUs can be used without deviating from the scope of the present disclosure. Examples of the I/O agents 108 include, but are not limited to, Industry Standard Architecture (ISA) devices, Peripheral Component Interconnect (PCI) devices, PCI-X devices, PCI Express devices, Universal Serial Bus (USB) devices, Advanced Technology Attachment (ATA) devices, Small Computer System Interface (SCSI) devices, and InfiniBand devices.

The processing unit cores 102, 104, 106, and the I/O agents 108 may be referred to as agents 102-108, each referenced by agent IDs (AIDs). These agents 102-108 may have multiple levels of internal caches such as L1, L2, and L3 caches. As the agents 102-108 cache coherent and shared memory blocks (cograns) in their internal caches, a snoop filter (SFT) 150 may keep track of a record and location of these cograns. Any of the agents 102-108 may issue coherent or non-coherent requests and the POS (Point of Serialization) 110 ensures the serialization of the memory access requests using the snoop filter 150 to provide memory coherency.

For example, the PoS 110 receives a coherent request 120 from a CPU 102. In response to the coherent request 120, the POS 110 issues a snoop command 122 to the CPU cores 104, the GPU 106, and the I/O agents 108. The CPU cores 104, the GPU 106, and the I/O agents 108 may provide the requested coherent information back to the POS 110. When sending the snoop 122, the POS 110 refers to the SFT 150.

An example implementation of the SFT 150 is illustrated by SFT 150a. The SFT 150a includes a data structure to track the address and agent(s) 102-108 that have obtained a copy of every cogran that is currently cached by agents 102-108. The SFT 150a may be an n-way set-associative organization as indicated by n-arrays 154. The snoop filter 150a may include an array of entries 152, the content of the entries 152 is further described below. Each of the entries 152 may include a Tag field, such as the Tag field 164, that is used to store a tag portion of physical address (PA) that identifies a cogran. For example, for cogran size of 64 bytes, and SFT being a 16-way associative SFT, bits 15:6 of the PA may be used to select an SFT set and bits 47:16 of the PA may be stored as the tag in the Tag field 164 of the SFT entry 152a. When the SFT 150a needs to perform a lookup to see if a cogran's PA is present in the SFT 150a, it selects one of the 1024 sets using PA [15:6]. Subsequently, for the selected set, the SFT 150a may compare 156 the PA [47:16] against the tag values stored in the Tag field 164 of the 16 SFT entries 152 in the selected set. If the Tag field 164 of any of the 16 SFT entries in the selected set finds a match, then its way (e.g., way 5) is currently tracking the cogran being looked up.

In the implementation of the cache coherence system disclosed herein, the SFT entry 152a may be configured to use a disaggregated vector table (DVT) 190 associated therewith to support a fixed number of implementation-defined precise tracking vectors. Various fields of the SFT entry 152a may include state field 162 that indicates the SFT entry's state as being valid or invalid. As discussed above, the Tag field 164 is used to store a tag portion of physical address (PA) that identifies a cogran. Furthermore, the SFT entry 152a also includes a miscellaneous field 166, a tracking_mode field 168, a tracking_info field 170, and a protection field 172.

According to the implementation of the cache coherence system disclosed herein, the tracking_mode field 168 may take three different values, namely: AID, IMPRECISE, and DVT. When tracking_mode is AID 180, the tracking_info field 170 stores up to two or more AIDs. The AID tracking_mode is a precise tracking mode where each AID stored in the tracking_info field tracks the ID of an owner/sharer of the cogran. A separate AID-valid per AID can be used to indicate which of the AID(s) fields are actively tracking an owner/sharer. The width of the AID may vary. When tracking_mode is IMPRECISE 182, the tracking_info field 170 contains a mechanism for tracking more agents imprecisely than the number of AIDs that can be held by tracking_info 170. This indicates an imprecise tracking mode where the limited number of bits in the tracking info field 170 must track all potential sharers (e.g., each bit represents a defined set of >1 agents). Over-snooping is likely to occur in this mode.

When tracking_mode is DVT 184, the tracking_info field 170 includes an index into the DVT. This is a precise tracking mode. In this mode, it may be preferred, but not required, to also hold a single AID and associated AID-valid bit, i.e., tracking_info field 170 is sized for "AID+DVT". This reduces the latency of requests that do not require access to the tracking table information for initial actions. According to the implementation of the cache coherence system disclosed herein, the SFT entry 152*a*, may switch between the three tracking modes, AID mode 180, IMPRECISE mode 182, and DVT mode 184, depending on real-time conditions and configuration settings of the SFT entry 152*a*.

The implementations disclosed herein add the DVT mode 184 to associate the SFT entries with DVT entries. Specifically, in the DVT mode 184, the tracking_info field 170 includes a DVT index. This allows implementation-defined customization of the size of the DVT mode's tracking_info field 170 for performance tradeoffs. Thus, the DVT mode 184 may be an AID+DVT option or a DVT-only option. The SFT 150*a* may include a DVT control block for managing access to and availability of the DVT 190.

Figure 2:
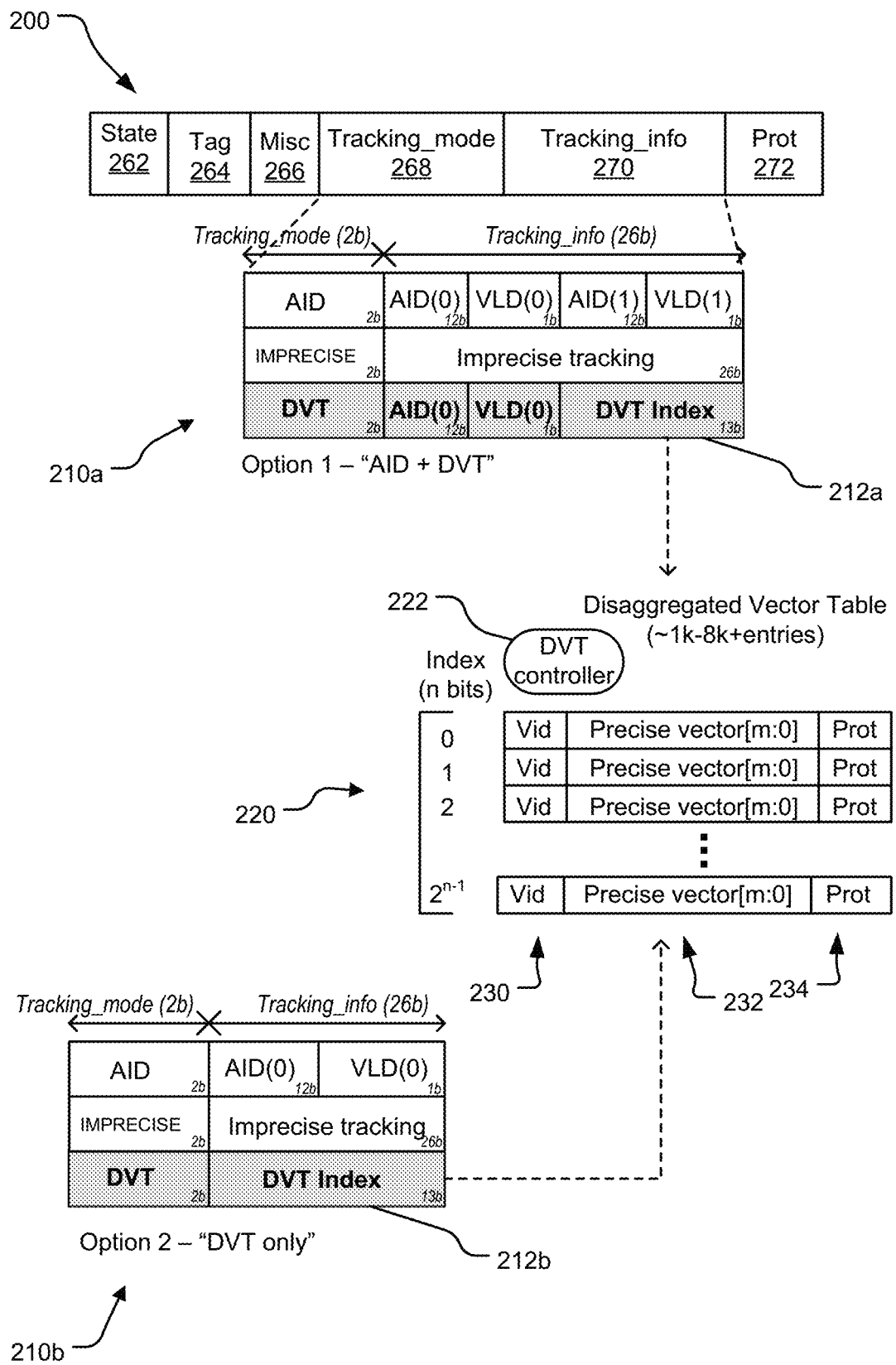
FIG. 2 illustrates an example structure of a snoop filter entry implementing the technology disclosed herein.

FIG. 2 illustrates a detailed structure of a snoop filter entry 200 implementing the technology disclosed herein. Specifically, as disclosed herein the snoop filter entry 200 includes a state field 262 that indicates whether the SFT entry 200 is a valid SFT entry or an invalid SFT entry. The Tag field 264 is used to store a tag portion of physical address (PA) that identifies a cogran. The miscellaneous field 266 may include other miscellaneous information. The protection field 272 may include an error correction code (ECC) that is used to ensure the integrity of the SFT entry 200. The tracking_mode field 268 may be a two (2) bit field that indicates whether the SFT entry 200 is in AID mode, IMPRECISE mode, or DVT mode.

In one implementation, the tracking_info field 270 may be 26 bits long. Depending on the tracking mode, the information stored in the tracking field changes. When in the AID mode, the tracking_info field 270 in this implementation stores up to two AIDs with a width of 13 bits each, including 12 bits to identify the AID (AID(0) or AID(1)) and 1 bit to indicate whether the AID is currently valid (VLD(0) and VLD(1)). The DVT tracking mode may be implemented with two options. With option 1 210*a*, the SFT entry is indicated as working in DVT mode with the AID+DVT option. In this mode, the tracking-info field 270 stores an AID for one agent, including 12 bits to identify the AID (AID(0)) and 1 bit to indicate whether the AID is currently valid (VLD(0)) and 13 bits for a DVT index 212*a*. With option 2 210*b*, the SFT entry is indicated as working in DVT mode with the DVT-only option. In this mode, the tracking-info field 270 stores only a DVT index 212*b*.

The DVT 220 may include a DVT controller 222 to control access to and the management of the DVT 220. Given that there are n bits in the DVT index 212 the DVT 220 may include up to 2n DVT entries. Specifically, the DVT index 212 may be used to record which DVT entry has been reserved for use by the SFT entry 200 to hold its tracking vector. Each of the 0 to 2 n–1 DVT entries may include a valid field 230 indicating if that DVT entry is being used. Each DVT entry may also include a precise vector 232 of m bits that can be used to track m agents. Here m is the maximum number of agents that can be sharing the cogran that's associated with this DVT entry.

In one implementation, each DVT entry may also include a protection field 234 to ensure the integrity of the DVT entry. The protection field may be generated using an error correcting scheme, such as parity, ECC, etc., to protect against soft errors. However, such protection field may be optional. The value of the protection field of a DVT entry may be compared against a calculated value of a protection field and in response to determining that the calculated value of the protection field does not match the value stored in the protection field, the tracking information held by the DVT entry can't be trusted, and the associated SFT entry would need to switch its tracking mode to IMPRECISE 182.

The DVT 220 may be implemented as a direct-mapped structure that is indexed by the DVT index of the tracking_info field, as a memory structure using flops, register file, SRAM, etc., with a shared read/write port. The DVT access is delayed compared to a lookup involving the associated SFT entry.

The DVT controller 222 is configured to manage availability of the DVT entries. The DVT controller 222 may track the total number of available entries as a free-list. For the DVT 220 with many entries, the DVT controller 222 may also continuously be aware of one or more available entries to expedite DVT entry assignment. In such implementation, new requests may claim available DVT entries and subsequent requests that are not able to claim a DVT entry are required to transition their associated SFT entry's tracking_mode to IMPRECISE. Furthermore, the DVT controller 222 is also configured to monitor when a DVT entry is no longer needed. This may occur, for example, when an agent's operation eliminates all sharing or the SFT entry associated with the DVT entry is victimized. In this case, the DVT controller 222 adds the freed DVT entry to the free-list of available DVT entries.

By disaggregating the precise vector tracking of the SFT entry to a separate structure, the area overhead and power consumption associated with the SFT entry 200 are reduced without giving up the ability to precisely track many agents for an implementation-defined number of cograns and based on the size of the DVT. Assuming a system with 128 agents, a snoop filter with 32K SFT entries, and a DVT 190 of 8K entries, the tracking_info overhead of each SFT entry is reduced from 128 bits to (a) 26 bits for the tracking_info field 270 for option 1 210*a* (AID+DVT mode) or (b) 13 bits for the tracking_info field 270 for option 2 210*b* (DVT only mode). While there is added area associated with the DVT 190, these implementations still result in significant overall area reduction given the number of SFT entries compared to the number to DVT entries. The overall power consumption is also reduced because any SFT lookup (required for every new memory access) accesses a narrower structure. Additionally, the DVT 190 is only accessed when it is known to be needed as identified by the tracking_mode field 268.

The technology disclosed herein reduces the amount of tracking information consumed by an SFT, thus reducing the required area and power consumption. For example, for an SFT having 32K entries where each entry has a 128 bit tracking vector, if only ¼th of the SFT entries in use actually have any shared cograns (shared means that >1 agent has cached the cogran concurrently), then ¾ of the SFT entries in use have tracking vectors with only a single bit set (single agent b/c that cogran is being shared currently) and this can be "tracked" by using an AID and therefore, the big tracking vector isn't needed for those cograns.

Specifically, in this example implementation, the technology disclosed herein pulls out the 8K (¼ of 32K) entries into a separate structure, DVT, wherein each DVT entry itself tracks all the agents that are associated with the cogran being tracked by the SFT entry that's using that DVT entry. For the times when an SFT entry needs to use one of the big tracking vectors because its cogran is shared, then it grabs a DVT entry to hold its tracking vector for its cogran; it then records the assigned DVT entry (=DVT index) to know where to find its tracking vector upon future SFT lookups.

Figure 3:
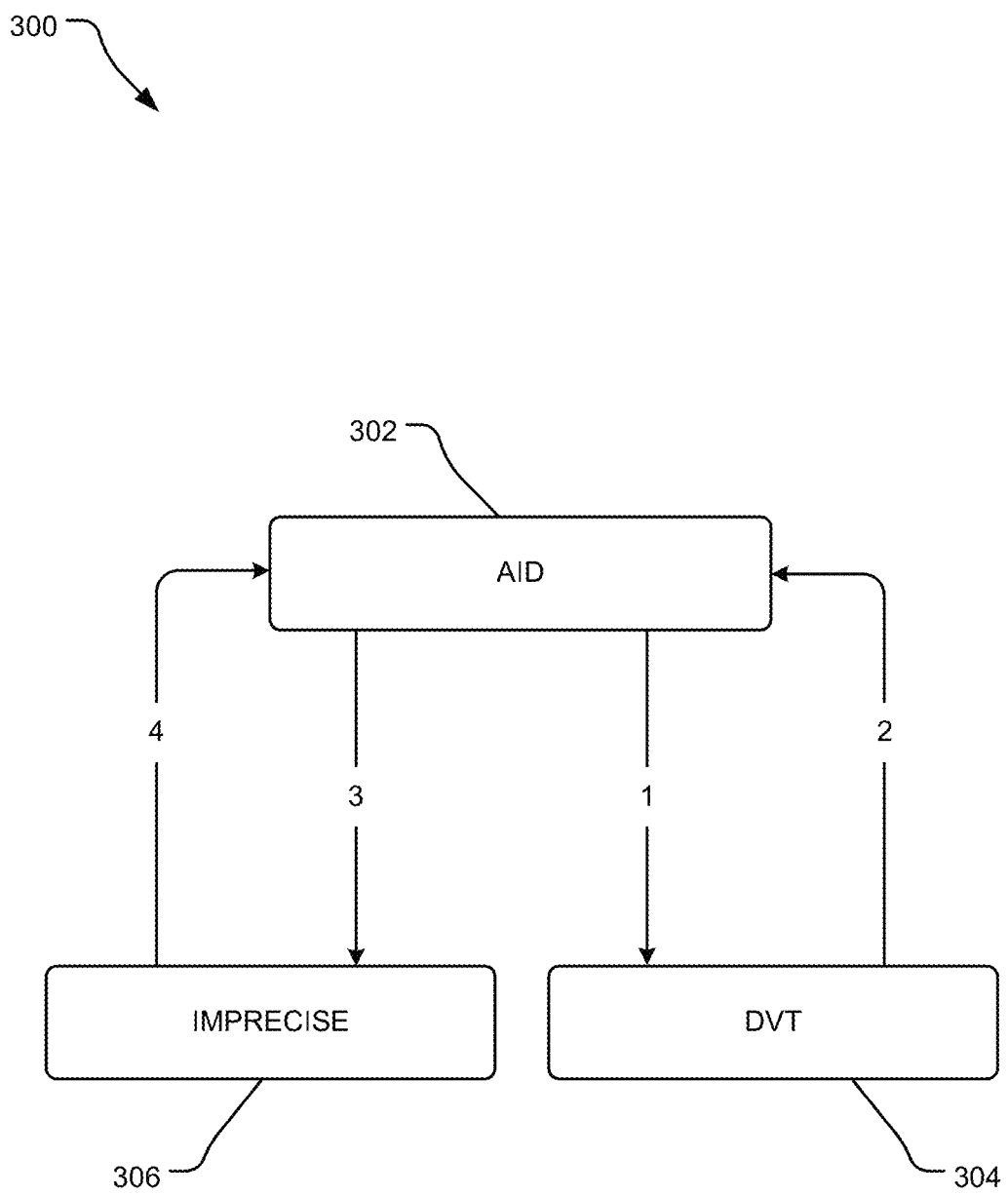
FIG. 3 illustrates example tracking modes for the SFT entry of the cache coherence system disclosed herein.

FIG. 3 illustrates tracking modes 300 for the SFT entry of the cache coherence system disclosed herein. As illustrated herein the each SFT entry independently switches between the three tracking_modes, namely: AID 302, DVT 304, and IMPRECISE 306, depending on real-time conditions and its configuration settings. At the time of its allocation an SFT entry starts in AID mode and if it later exhausts its ability to add new AIDs to its tracking, it needs to switch to either DVT 304 mode (if a DVT entry is available) or to IMPRECISE 306 (if no DVT entry is available). More details regarding the transitions between the AID 302, DVT 304, and IMPRECISE 306 modes are described below with respect to FIGS. 5-9.

Figure 4:
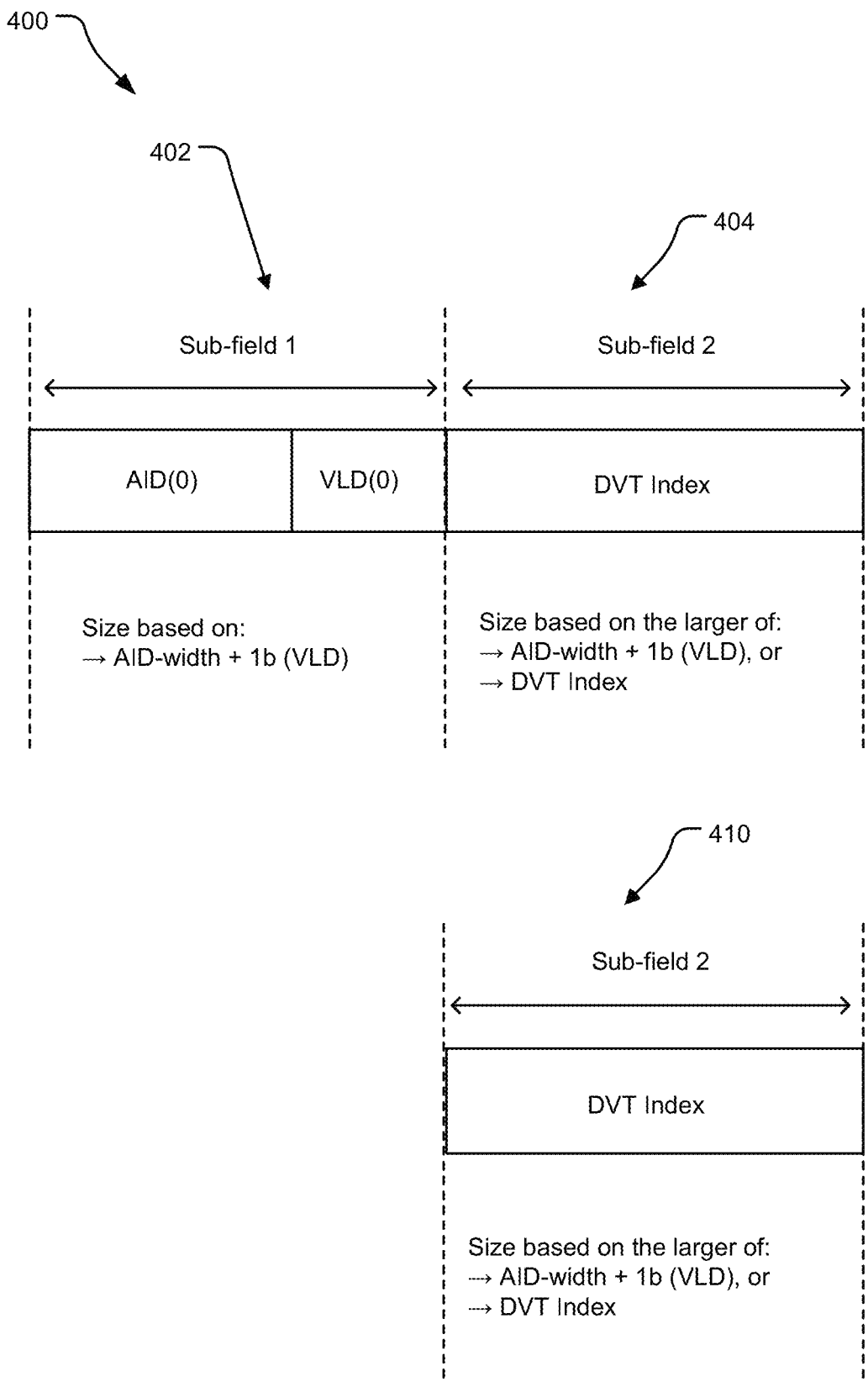
FIG. 4 illustrates example values of various fields of an SFT entry of the cache coherence system disclosed herein.

FIG. 4 illustrates example composition of the tracking_info field 400 of an SFT entry of the cache coherence system disclosed herein when the SFT entry is in DVT mode and the AID+DVT option. Here, when an SFT entry is in the AID tracking mode, the SFT entry can track two AIDs precisely in two sub-fields. A first sub-field 402 of the tracking_info field 400 may store an AID and its valid bit, where the size of the AID may vary. When in AID mode, a second sub-field 404 may store a second AID and its valid bit, where the size of the second AID may vary as well. The AID tracking mode allows the SFT entry to track two or more agents and in this mode, a DVT entry is not needed.

In the DVT tracking mode, the second sub-field 404 may store a DVT index. Here the number of bits of the DVT index depends on the desired number of DVT entries required to be indexed into the DVT 220. For example, a 13 bit DVT index may be used to select from among 8K ($2^{13}$) DVT entries. However, the DVT index size does not necessarily have to be 13 bits to fill the second sub-field 404. For example, in one implementation, if only 1K ($2^{10}$) DVT entries exist, the size of the DVT index and therefore the second sub-field 404 may be only 10 bits.

When in the DVT tracking mode, the SFT entry can continue to track one AID in addition to the DVT index. This is advantageous because for most memory accesses, the SFT entry contains enough information to initiate the next action without reading the DVT. In other words, if a new sharer is performing a load, a snoop can be sent to the AID in first sub-field 402 before the DVT needs to be accessed. In these common cases there is no additional latency to perform that next action.

When the SFT entry is in the DVT mode and DVT-only option, it may require only one field 410, and the size of the field 410 may be the larger of (a) size of an AID storage+valid bit and (b) the number of bits required to index into a DVT holding the desired number of DVT entries that exist in the DVT. The DVT-only option minimizes the size of the tracking_info field 400 but requires the DVT 304 or IMPRECISE 306 modes for a cogran that has any sharing.

Figure 5:
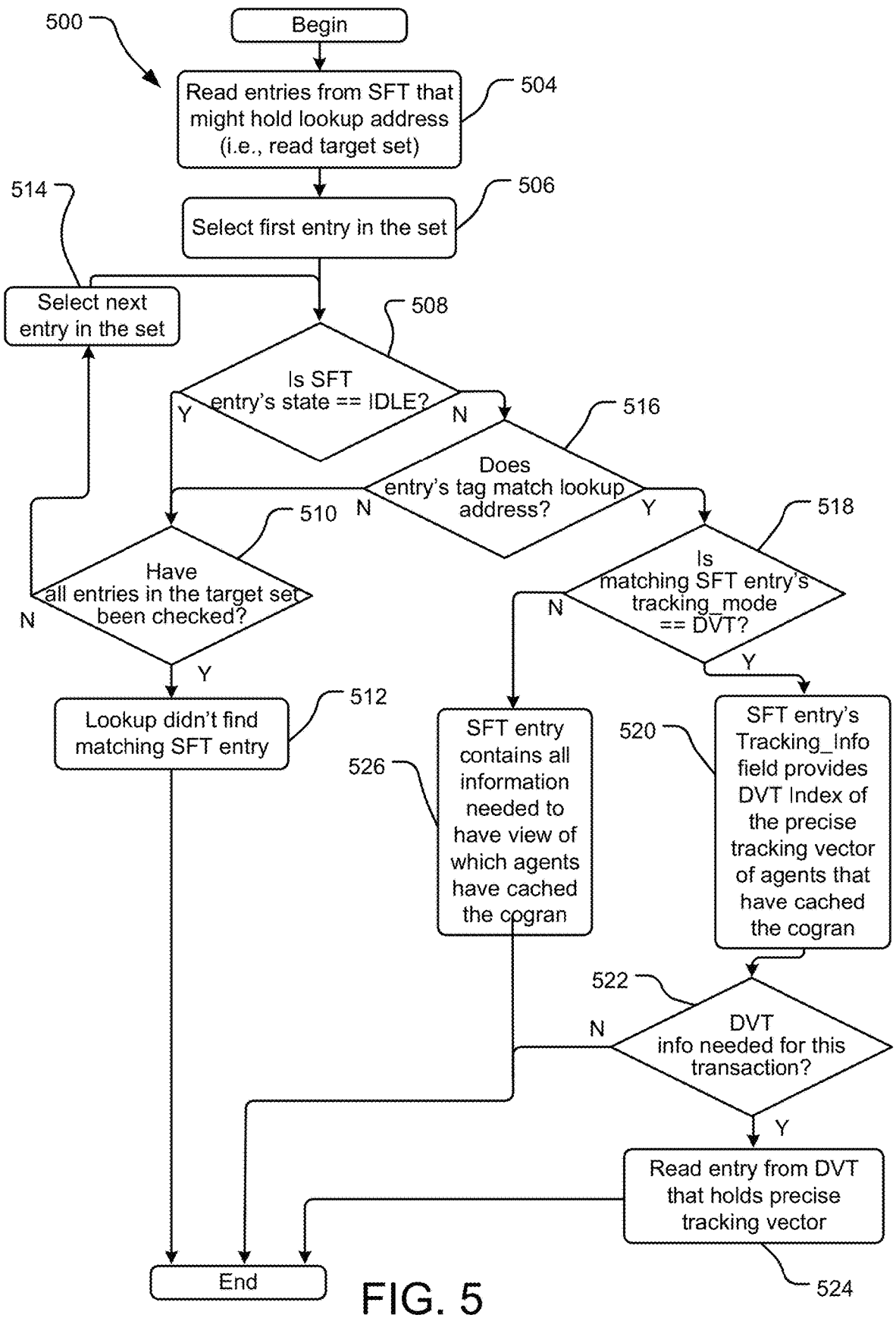
FIG. 5 illustrates example operations for a case when an agent wants to access a cogran and the SFT needs to be checked to see if a snoop is needed.

FIG. 5 illustrates operations 500 for a case when an agent wants to access a cogran and the SFT needs to be checked to see if a snoop is needed. With the operations 500, if an SFT lookup operation is a hit and the matching SFT entry's tracking_mode is DVT, then depending on the type of the memory access, a DVT entry may be accessed. An operation 504 reads a set of SFT entries from an SFT that may hold an address of a cogran being looked up. An operation 506 selects a first SFT entry from the set of SFT entries and for the selected SFT entry, an operation 508 determines if the state of the selected SFT entry is IDLE (i.e., invalid) or not. If the state of the selected SFT entry is IDLE, an operation 510 determines if all the entries read at the operation 500 have been checked. If all entries have been checked, an operation 512 determines that the SFT lookup did not find a matching SFT entry. If all entries have not been checked, an operation 514 selects the next entry in the selected set of entries.

If the operation 508 determines that the state of the selected SFT entry is not IDLE, an operation 516 determines if the selected SFT entry's tag matches the address being looked up. If the selected SFT entry's tag does not match the address being looked up, control is transferred to operation 510. However, if the selected SFT entry's tag matches the address being looked up, an operation 518 determines if the matching SFT entry's tracking_mode is DVT. If the tracking_mode is not DVT, an operation 526 determines that the matching SFT entry contains all the information that is available to have a view of which agents have cached the cogran.

If the matching SFT entry's tracking_mode is DVT, an operation 520 determines that the matching SFT entry's tracking_info field provides the DVT index that's used to select the DVT entry that holds the precise tracking vector of agents that have cached that SFT entry's cogran. Subsequently, an operation 522 determines if the DVT information is needed for the cogran access that initiated the SFT lookup. If the DVT information is needed for the cogran access, an operation 524 reads the DVT entry from the DVT using the DVT index that is associated with the SFT entry.

Figure 6:
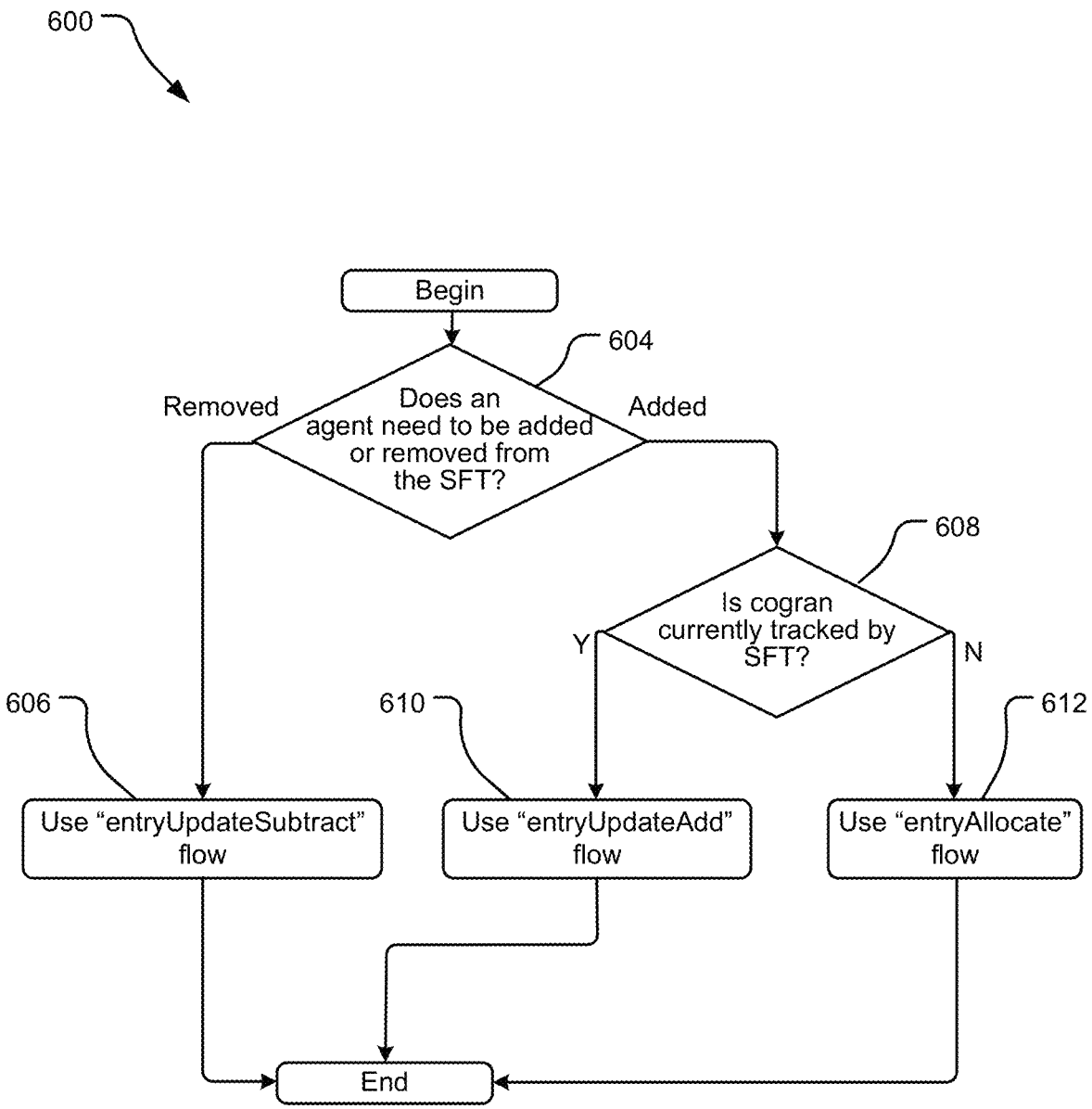
FIG. 6 illustrates example operations for a case when an SFT update is needed.

FIG. 6 illustrates operations 600 to determine which of the flows of operations is to be selected for an SFT update. Specifically, the operations 600 determine, for an SFT access, whether to allocate an entry (illustrated further below in FIG. 7), add an agent to an existing SFT and/or DVT entry's tracking (illustrated further below in FIG. 8), or remove an agent from an existing SFT and/or DVT entry's tracking (illustrated further below in FIG. 9). As illustrated, the operations 600 are implemented for a case when it is known that one of the following three is true for an agent and therefore an SFT update is needed: (a) the agent is accessing a cogran that's not currently tracked by the SFT but needs to be, (b) the agent is newly caching a cogran that's currently tracked by the SFT, or (c) the agent is known to have evicted its copy of a cogran that's currently tracked by the SFT.

An operation 604 determines if an agent needs to be added or removed from the SFT. If an agent needs to be removed, an operation 606 uses an "entryUpdateSubtract" flow to remove an agent from an existing entry's tracking (illustrated further below in FIG. 9). If an agent needs to be added, an operation 608 determines if the cogran is currently tracked by the SFT. If yes, an operation 610 uses an "entryUpdateAdd" flow to add an agent to an existing entry's tracking (illustrated further below in FIG. 8). If no, an operation 612 uses an "entry Allocate" flow to allocate an entry (illustrated further below in FIG. 7).

Figure 7:
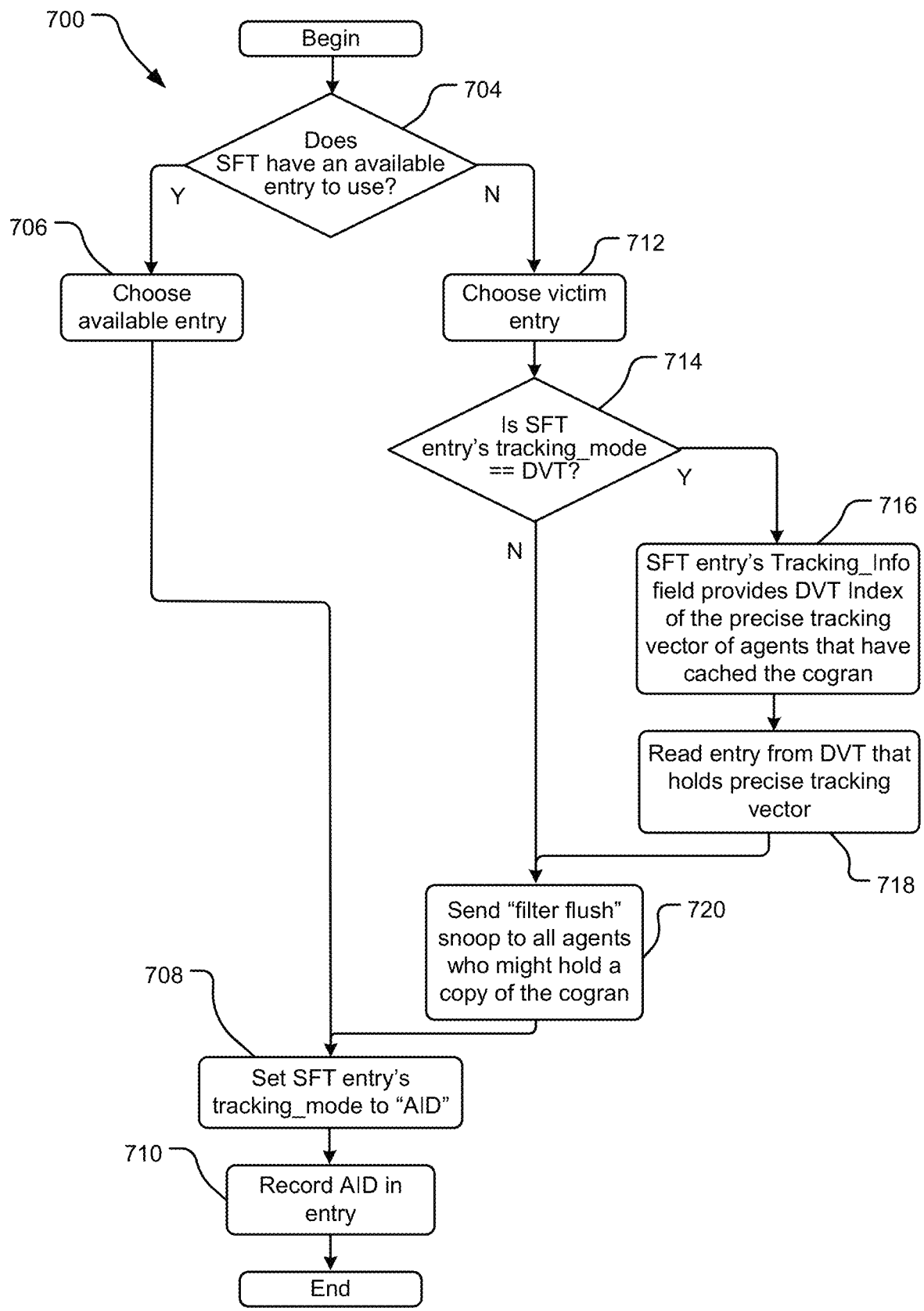
FIG. 7 illustrates example operations for a case when an agent newly caches a copy of a cogran that is not currently tracked by the SFT.

FIG. 7 illustrates operations 700 for a case when an agent newly caches a copy of a cogran that is not currently tracked by the SFT. Specifically, when the SFT needs to add a new cogran to its tracking for the first time, an operation 704 determines if there are any available SFT entries in the SFT that may accept the new cogran. If yes, one of those available SFT entries is selected at operation 706. However, if none of the SFT entries are available, as per an operation 712, the SFT makes space by selecting a victim SFT entry to remove and then sending a "filter flush" snoop to all agents indicated by the entry who might hold a copy of the victim cogran. In this case, because the victim cogran is being evicted from the SFT, future SFT lookups to search for that cogran will miss the SFT. Therefore, the SFT uses this to know that a snoop doesn't need to be sent before that cogran is accessed. Therefore, any agents that currently hold a copy of the victim cogran must flush the cogran from their cache when the SFT evicts that cogran.

Subsequently, an operation 714 determines if the victim SFT entry's tracking_mode is DVT. If the SFT entry's tracking mode is not DVT, an operation 720 sends a filter flush snoop to all agents that may hold a copy of the cogran. If the SFT entry's tracking mode is DVT, then the filter flush is dependent on the read of the DVT and the precise tracking vector from the DVT entry determines which agents must be snooped. Therefore, an operation 716 reads the SFT entry's tracking_info field to determine the DVT index that's used to select from the DVT the precise tracking vector of agents that have cached the cogran and an operation 718 reads the DVT entry from the DVT that holds the precise tracking vector. Subsequently, an operation 720 sends a "filter flush" to all agents that may hold a copy of the cogran.

After each of the operations 706 or 720, an operation 708 sets the SFT entry's state as VALID and the tracking mode as AID for the new cogran being added to the SFT because at this point there is only a single agent caching the cogran. Subsequently, an operation 710 records the cogran's address, agent AID, and other SFT entry metadata.

Figure 8:
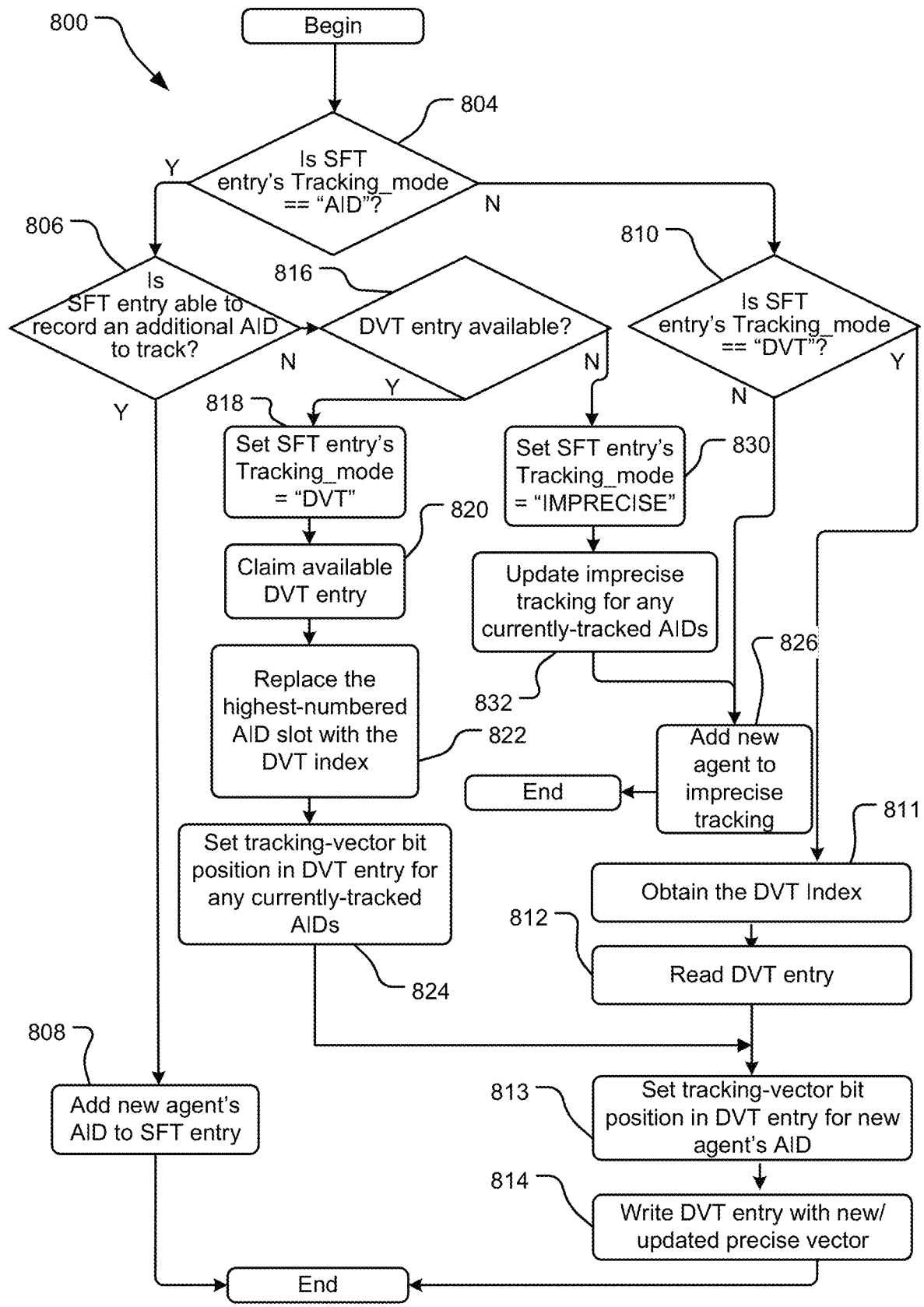
FIG. 8 illustrates example operations for a case when an agent newly caches a copy of a cogran that is currently tracked by the SFT.

FIG. 8 illustrates operations 800 for a case when an agent newly caches a copy of a cogran that is currently tracked by the SFT. Specifically, the operations 800 are used when the SFT needs to add an agent to an existing SFT entry that is already tracking the cogran that the agent intends to cache. An operation 804 determines if an SFT-entry's tracking mode is AID. If so, an operation 806 determines if the SFT entry is able to record an additional AID in its tracking_info field. If the SFT entry is able to record an additional AID to its tracking_info field, an operation 808 adds the new agent's AID to the SFT entry.

If the SFT entry's tracking mode is not AID, an operation 810 determines if the SFT entry's tracking_mode is DVT. If the SFT entry's tracking_mode is DVT, an operation 811 obtains the DVT index from the SFT entry's tracking_info field and an operation 812 reads the DVT entry pointed to by the DVT index. Subsequently, an operation 813 sets the tracking vector bit position in the DVT entry for the new agents's AID and an operation 814 writes the DVT entry with the new/updated precise vector. If the SFT entry's tracking_mode is not DVT, an operation 826 adds the new agent to imprecise tracking.

If the operation 806 determines that the SFT entry is not able to record an additional AID to track, an operation 816 determines if a DVT entry is available. If a DVT entry is available, an operation 818 sets the SFT entry's tracking_mode to DVT and an operation 820 claims an available DVT entry. Subsequently, an operation 822 replaces one or more AID slots in the SFT entry's tracking_info field with the DVT index, for example, the highest-numbered AID slot in the SFT entry's tracking_info field may be replaced with the DVT index. An operation 824 sets the tracking vector bit position in the DVT entry for any currently tracked AIDs. If the operation 816 determines that a DVT entry is not available, an operation 830 sets the SFT entry's tracking_mode to IMPRECISE and an operation 832 updates imprecise tracking for any currently tracked AIDs.

Figure 9:
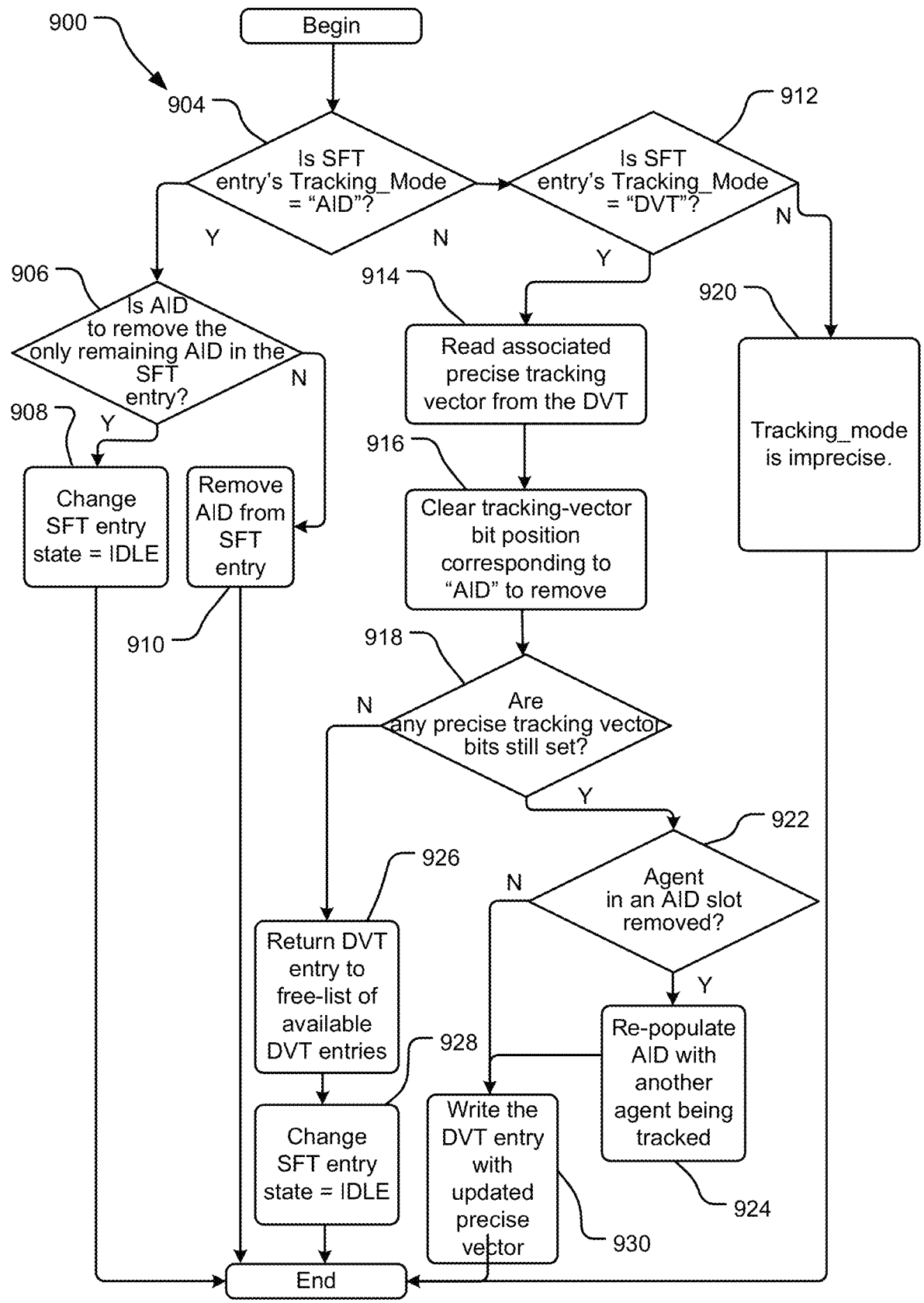
FIG. 9 illustrates example operations for a case when an agent communicates that it is evicting a cogran from its cache.

FIG. 9 illustrates operations 900 for a case when an agent communicates that it is evicting a cogran from its cache. Specifically, operations 900 are used when the SFT needs to remove an agent from an existing SFT entry as the agent is known to have given up its copy of the cogran. An operation 904 determines if the SFT entry's tracking_mode is AID. If the SFT entry's tracking_mode is AID, an operation 906 determines if the AID to be removed from the SFT entry is the only remaining AID in the SFT entry. If the AID to be removed from the SFT entry is the only remaining AID in the SFT entry, an operation 908 changes the state of the SFT entry to IDLE. If the AID to be removed from the SFT entry is not the only remaining AID in the SFT entry, an operation 910 removes the AID from the SFT entry.

If the operation 904 determines that the SFT entry's tracking_mode is not AID, an operation 912 determines if the SFT entry's tracking_mode is DVT. If the SFT entry's tracking_mode is not DVT, an operation 920 determines the SFT entry's tracking_mode is IMPRECISE. If the SFT entry's tracking_mode is DVT an operation 914 uses the SFT entry's DVT index to read the DVT to obtain the precise tracking vector from the DVT entry that is associated with the SFT entry. Subsequently, an operation 916 clears the tracking_vector bit position corresponding to the AID of the agent that's evicting the cogran.

Subsequently, an operation 918 determines if any precise tracking vector bits are still set. If no precise tracking vector bits are still set, an operation 926 returns the DVT entry to free-list of available DVT entries and an operation 928 changes the SFT entry's state to IDLE. If any precise tracking vector bits are still set, an operation 922 determines if the agent being removed is also in an AID slot; if so, the AID is removed from the SFT entry's AID slot that contains that AID. If an agent in an AID slot is removed, an operation 924 re-populates the AID with another agent being tracked and then an operation 930 writes the DVT entry with the updated precise vector. If an agent in an AID slot is not removed, an operation 930 writes the DVT entry with the updated precise vector.

The cache coherence system disclosed herein greatly reduce the tracking overhead in the SFT while still provisioning for some (implementation defined) number of cograns that can be tracked with a precise tracking vector. Specifically, the cache coherence system disclosed herein takes advantage of the nature of cogran use in that while the amount of tracking information for each cogran is variable as it depends on the number of agents sharing the cogran concurrently, most cograns are not widely shared.

Specifically, the cache coherence system disclosed herein uses a direct-mapped disaggregated vector table (DVT) and controls for managing the DVT. A DVT entry is accessed sequentially later in time compared to its associated SFT entry. While this may add latency for certain types of memory accesses, the additional latency is generally acceptable when >2 agents are sharing a cogran and snooping (which already adds considerable latency to memory transactions) is required. Compared to other cache coherence systems, the system disclosed herein has an advantage in that it does not affect the SFT associativity when some/all the cograns of an SFT set transition to a precise tracking vector. Specifically, the cache coherence system disclosed herein is more tolerant of an AID mode sized for 2 AIDs, which results in a smaller tracking_info field per SFT entry.

Furthermore, compared to other implementations, the cache coherence system disclosed herein also reduces the area overhead and static power because the overall number of bits provisioned for each SFT entry's precise tracking vector is significantly reduced and can be used more efficiently. Furthermore, the cache coherence system disclosed herein also reduces the dynamic power because the DVT is only accessed when necessary and every SFT lookup (the most common access) is accessing fewer bits. This is also not only because the precise tracking vector is only accessed when needed but also because only the precise tracking vector of the target way is accessed (as opposed to all ways associated with the SFT lookup).

Similarly, compared to implementations of cache coherence systems where every SFT entry may be provisioned for limited precise+imprecise tracking, the cache coherence systems disclosed herein reduces the dynamic power and generally improves performance because it reduces over-snooping. In other words, it reduces messages to/from, reduces cache access within, and minimizes interruption of agents that otherwise did not need to be snooped.

Figure 10:
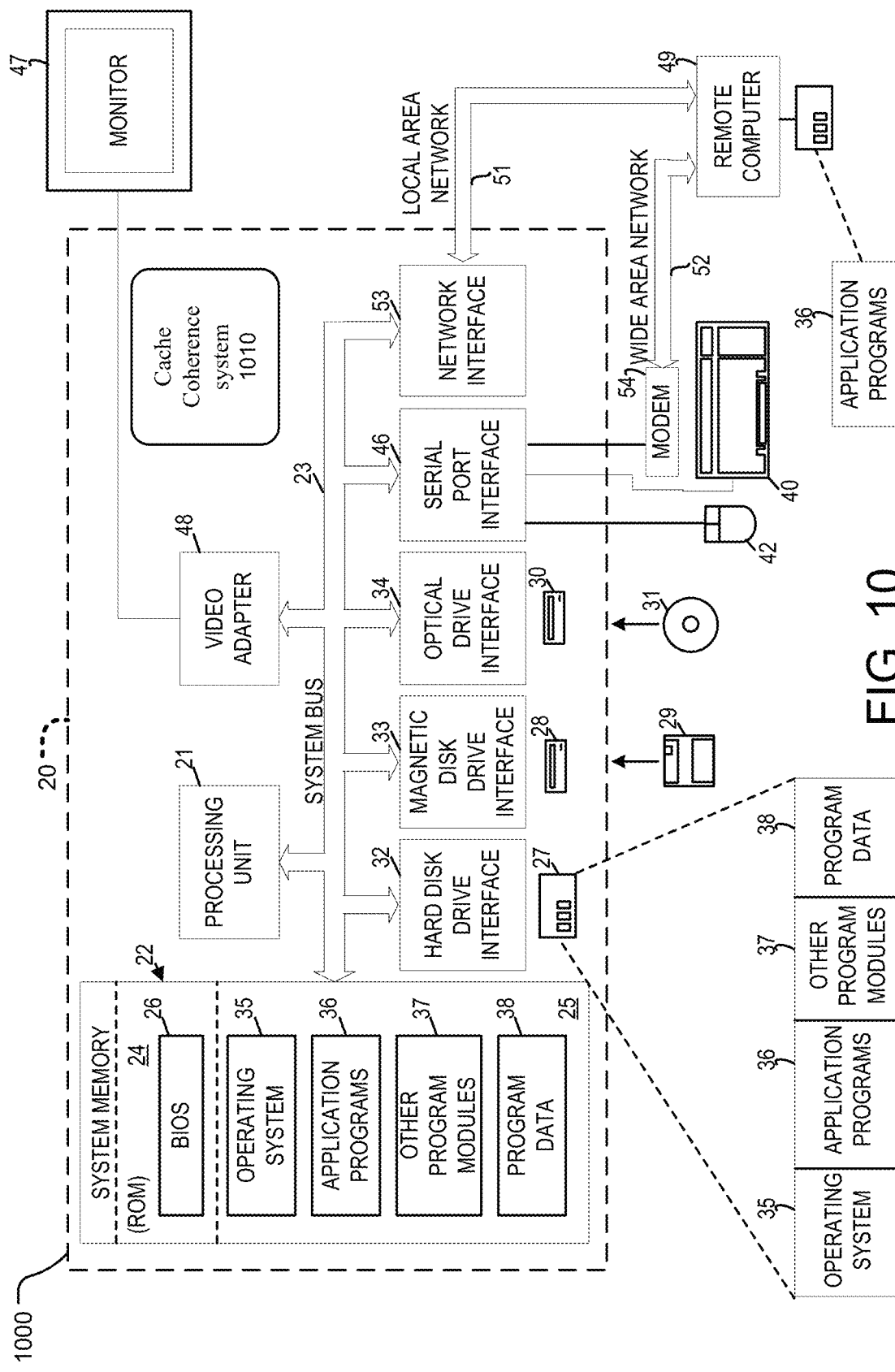
FIG. 10 illustrates an example system that may be useful in implementing the cache coherence system disclosed herein.

FIG. 10 illustrates an example system 1100 that may be useful in implementing the cache coherence system 1010 disclosed herein. The example hardware and operating environment of FIG. 10 for implementing the described technology includes a computing device, such as a general-purpose computing device in the form of a computer 20, a mobile telephone, a personal data assistant (PDA), a tablet, smart watch, gaming remote, or other type of computing device. In the implementation of FIG. 10, for example, the computer 20 includes a processing unit 21, a system memory 22, and a system bus 23 that operatively couples various system components, including the system memory 22 to the processing unit 21. There may be only one or there may be more than one processing units 21, such that the processor of a computer 20 comprises a single central-processing unit (CPU), or a plurality of processing units, commonly referred to as a parallel processing environment. The computer 20 may be a conventional computer, a distributed computer, or any other type of computer; the implementations are not so limited.

The system bus 23 may be any of several types of bus structures, including a memory bus or memory controller, a peripheral bus, a switched fabric, point-to-point connections, and a local bus using any of a variety of bus architectures. The system memory 22 may also be referred to as simply the memory and includes read-only memory (ROM) 24 and random-access memory (RAM) 25. A basic input/output system (BIOS) 26, contains the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM, DVD, or other optical media.

The computer 20 may be used to implement a cache coherence system disclosed herein. In one implementation, a frequency unwrapping module, including instructions to unwrap frequencies based at least in part on the sampled reflected modulations signals, may be stored in memory of the computer 20, such as the read-only memory (ROM) 24 and random-access memory (RAM) 25.

Furthermore, instructions stored on the memory of the computer 20 may be used to generate a transformation matrix using one or more operations disclosed in FIGS. 5-9. Similarly, instructions stored on the memory of the computer 20 may also be used to implement one or more operations of FIGS. 5-9. The memory of the computer 20 may also one or more instructions to implement the cache coherence system disclosed herein.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated tangible computer-readable media provide non-volatile storage of computer-readable instructions, data structures, program modules and other data for the computer 20. It should be appreciated by those skilled in the art that any type of tangible computer-readable media may be used in the example operating environment.

A number of program modules may be stored on the hard disk, magnetic disk 29, optical disk 31, ROM 24, or RAM 25, including an operating system 35, one or more application programs 36, other program modules 37, and program data 38. A user may generate reminders on the personal computer 20 through input devices such as a keyboard 40 and pointing device 42. Other input devices (not shown) may include a microphone (e.g., for voice input), a camera (e.g., for a natural user interface (NUI)), a joystick, a game pad, a satellite dish, a scanner, or the like. These and other input devices are often connected to the processing unit 21 through a serial port interface 46 that is coupled to the system bus 23, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the implementations are not limited to a particular type of communications device. The remote computer 49 may be another computer, a server, a router, a network PC, a client, a peer device, or other common network node, and typically includes many or all of the elements described above relative to the computer 20. The logical connections depicted in FIG. 10 include a local-area network (LAN) 51 and a wide-area network (WAN) 52. Such networking environments are commonplace in office networks, enterprise-wide computer networks, intranets, and the Internet, which are all types of networks.

When used in a LAN-networking environment, the computer 20 is connected to the local area network 51 through a network interface or adapter 53, which is one type of communications device. When used in a WAN-networking environment, the computer 20 typically includes a modem 54, a network adapter, a type of communications device, or any other type of communications device for establishing communications over the wide area network 52. The modem 54, which may be internal or external, is connected to the system bus 23 via the serial port interface 46. In a networked environment, program engines depicted relative to the personal computer 20, or portions thereof, may be stored in the remote memory storage device. It is appreciated that the network connections shown are example and other means of communications devices for establishing a communications link between the computers may be used.

In an example implementation, software, or firmware instructions for the cache coherence system 1010 may be stored in system memory 22 and/or storage devices 29 or 31 and processed by the processing unit 21. Cache coherence system operations and data may be stored in system memory 22 and/or storage devices 29 or 31 as persistent data-stores.

In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

Some embodiments of cache coherence system may comprise an article of manufacture. An article of manufacture may comprise a tangible storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In one embodiment, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner, or syntax, for instructing a computer to perform a certain function. The instructions may be implemented using any suitable high-level, low-level, object-oriented, visual, compiled and/or interpreted programming language.

The cache coherence system disclosed herein may include a variety of tangible computer-readable storage media and intangible computer-readable communication signals. Tangible computer-readable storage can be embodied by any available media that can be accessed by the cache coherence system disclosed herein and includes both volatile and nonvolatile storage media, removable and non-removable storage media. Tangible computer-readable storage media excludes intangible and transitory communications signals and includes volatile and nonvolatile, removable, and non-removable storage media implemented in any method or technology for storage of information such as computer readable instructions, data structures, program modules or other data. Tangible computer-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information, and which can be accessed by the cache coherence system disclosed herein. In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals moving through wired media such as a wired network or direct-wired connection, and signals moving through wireless media such as acoustic, RF, infrared and other wireless media.

The described technology provides a method including receiving a request from an agent for accessing a cogran and for allocating an agent ID to one of a plurality of SFT entries in a snoop filter (SFT), performing a tag lookup function for a tag of the cogran in the SFT to find a matched SFT entry, wherein the matched SFT entry is tracking the tag of the cogran, determining the number n of agents being tracked by the matched SFT entry, and in response to determining that the number n of agents being tracked by the matched entry is above a threshold, storing a DVT index in the tracking_info field of the matched SFT entry, wherein the DVT index selects a DVT entry in a disaggregated vector table (DVT), wherein the selected DVT entry is configured to hold a tracking vector for tracking the agents that have cached the cogran for the matched SFT entry.

An implementation includes one or more physically manufactured computer-readable storage media, encoding computer-executable instructions for executing on a computer system a computer process, the computer process including receiving a request from an agent for accessing a cogran and for allocating an agent ID to one of a plurality of SFT entries in a snoop filter (SFT), performing a tag lookup function for a tag of the cogran in the SFT to find a matched SFT entry, wherein the matched SFT entry is tracking the tag of the cogran, determining the number n of agents being tracked by the matched SFT entry, and in response to determining that the number n of agents being tracked by the matched entry is above a threshold, storing a DVT index in the tracking_info field of the matched SFT entry, wherein the DVT index selects a DVT entry in a disaggregated vector table (DVT), wherein the selected DVT entry is configured to hold a tracking vector for tracking the agents that have cached the cogran for the matched SFT entry.

Another implementation provides a system including memory, one or more processor units, and a cache coherence system stored in the memory and executable by the one or more processor units, the cache coherence system encoding computer-executable instructions on the memory for executing on the one or more processor units a computer process, the computer process including receiving a request from an agent for accessing a cogran and for allocating an agent ID to one of a plurality of SFT entries in a snoop filter (SFT), performing a tag lookup function for a tag of the cogran in the SFT to find a matched SFT entry, wherein the matched SFT entry is tracking the tag of the cogran, determining the number n of agents being tracked by the matched SFT entry, and in response to determining that the number n of agents being tracked by the matched entry is above a threshold, storing a DVT index in the tracking_info field of the matched SFT entry, wherein the DVT index selects a DVT entry in a disaggregated vector table (DVT), wherein the selected DVT entry is configured to hold a tracking vector for tracking the agents that have cached the cogran for the matched SFT entry.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized.

Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language. The above specification, examples, and data, together with the attached appendices, provide a complete description of the structure and use of exemplary implementations.

What is claimed is:

1. A method, comprising:
receiving a request from an agent for accessing a coherence granule (cogran) and for allocating an agent ID to one of a plurality of SFT entries in a snoop filter (SFT);
performing a tag lookup function for a tag of the cogran in the SFT to find a matched SFT entry, wherein the matched SFT entry is tracking the tag of the cogran;
determining the number n of agents being tracked by the matched SFT entry;
in response to determining that the number n of agents being tracked by the matched entry is above a threshold, storing a DVT index in the tracking_info field of the matched SFT entry, wherein the DVT index selects a DVT entry in a disaggregated vector table (DVT), wherein the selected DVT entry is configured to hold a tracking vector for tracking the agents that have cached the cogran for the matched SFT entry;
and in response to storing a DVT index in the tracking_info field of the matched SFT entry changing a value of a tracking_mode field of the matched SFT entry to DVT.

2. The method of claim 1, further comprising:
in response to determining that the number n of agents being tracked by the matched SFT is below a threshold, storing an agent ID (AID) of the agent accessing the cogran in the tracking_info field of the matched SFT entry.

3. The method of claim 1, further comprising changing a valid bit corresponding to the agent accessing the cogran in the DVT entry's tracking vector to valid.

4. The method of claim 1, further comprising:
calculating an error correction code (ECC) of a DVT entry;
comparing the calculated ECC with the matching a value of a protection field of the DVT entry; and
in response to determining that the calculated ECC does not match the value of a protection field of the DVT entry, changing a value the tracking_mode field of the matched SFT entry to IMPRECISE.

5. The method of claim 1, further comprising:
in response to determining that the number n of agents being tracked by the matched entry is above a threshold, determining if a DVT entry is available;
in response to determining that a DVT entry is not available, setting the SFT entry's tracking_mode to IMPRECISE; and
in response to determining that a DVT entry is available, setting the SFT entry's tracking_mode to DVT.

6. The method of claim 1, further comprising:
in response to determining that the number n of agents being tracked by the matched entry is above a threshold, determining if a DVT entry is available; and
in response to determining that a DVT entry is available:
setting the SFT entry's tracking mode to DVT, and replacing one or more AIDs of the tracking_info field with the DVT index.

7. The method of claim 1, further comprising:
determining that an agent needs to be removed from an SFT entry;
in response to determining that an agent needs to be removed from an SFT entry, determining if the SFT entry's tracking mode is DVT;
in response to determining that the SFT entry's tracking mode is DVT:
reading a precise tracking vector from a DVT entry associated with the SFT entry, and
clearing the read DVT entry's tracking vector bit position corresponding to the agent being removed from the SFT entry.

8. The method of claim 7, further comprising determining if any precise tracking vector bit is still set in the DVT entry associated with the SFT entry and if no precise tracking vector bit is still set in the DVT entry associated with the SFT entry returning the DVT entry to a free-list of available DVT entries.

9. One or more tangible physically manufactured computer-readable storage media, encoding computer-executable instructions for executing on a computer system a computer process, the computer process comprising:
receiving a request from an agent for accessing a coherence granule (cogran) and for allocating an agent ID to one of a plurality of SFT entries in a snoop filter (SFT);
performing a tag lookup function for a tag of the cogran in the SFT to find a matched SFT entry, wherein the matched SFT entry is tracking the tag of the cogran;
determining the number n of agents being tracked by the matched SFT entry;
in response to determining that the number n of agents being tracked by the matched entry is above a threshold, storing a DVT index in the tracking_info field of the matched SFT entry, wherein the DVT index selects a DVT entry in a disaggregated vector table (DVT), wherein the selected DVT entry is configured to hold a tracking vector for tracking the agents that have cached the cogran for the matched SFT entry;
and in response to storing a DVT index in the tracking_info field of the matched SFT entry changing a value of a tracking_mode field of the matched SFT entry to DVT.

10. The one or more tangible physically manufactured computer-readable storage media of claim 9, wherein the computer process further comprising:
in response to determining that the number n of agents being tracked by the matched SFT is below a threshold, storing an agent ID (AID) of the agent accessing the cogran in the tracking_info field of the matched SFT entry.

11. The one or more tangible physically manufactured computer-readable storage media of claim 9, wherein the computer process further comprising changing a valid bit corresponding to the agent accessing the cogran in the DVT entry's tracking vector to valid.

12. The one or more tangible physically manufactured computer-readable storage media of claim 9, wherein the computer process further comprising:
calculating an error correction code (ECC) of a DVT entry;
comparing the calculated ECC with the matching a value of a protection field of the DVT entry; and
in response to determining that the calculated ECC does not match the value of a protection field of the DVT entry, changing a value the tracking_mode field of the matched SFT entry to IMPRECISE.

13. The one or more tangible physically manufactured computer-readable storage media of claim 9, wherein the computer process further comprising:
    in response to determining that the number n of agents being tracked by the matched entry is above a threshold, determining if a DVT entry is available;
    in response to determining that a DVT entry is not available, setting the SFT entry's tracking_mode to IMPRECISE; and
    in response to determining that a DVT entry is available, setting the SFT entry's tracking_mode to DVT.

14. The one or more tangible physically manufactured computer-readable storage media of claim 9, wherein the computer process further comprising:
    in response to determining that the number n of agents being tracked by the matched entry is above a threshold, determining if a DVT entry is available; and
    in response to determining that a DVT entry is available:
        setting the SFT entry's tracking mode to DVT, and
        replacing one or more AIDs of the tracking_info field with the DVT index.

15. A system comprising:
    memory;
    one or more processor units; and
    a cache coherence system stored in the memory and executable by the one or more processor units, the cache coherence system encoding computer-executable instructions on the memory for executing on the one or more processor units a computer process, the computer process comprising:
        receiving a request from an agent for accessing a coherence granule (cogran) and for allocating an agent ID to one of a plurality of SFT entries in a snoop filter (SFT);
        performing a tag lookup function for a tag of the cogran in the SFT to find a matched SFT entry, wherein the matched SFT entry is tracking the tag of the cogran;
        determining the number n of agents being tracked by the matched SFT entry;
        in response to determining that the number n of agents being tracked by the matched entry is above a threshold, storing a DVT index in the tracking_info field of the matched SFT entry, wherein the DVT index selects a DVT entry in a disaggregated vector table (DVT), wherein the selected DVT entry is configured to hold a tracking vector for tracking the agents that have cached the cogran for the matched SFT entry;
        and in response to storing a DVT index in the tracking_info field of the matched SFT entry changing a value of a tracking_mode field of the matched SFT entry to DVT.

16. The system of claim 15, wherein the computer process further comprising:
    in response to determining that the number n of agents being tracked by the matched SFT is below a threshold, storing an agent ID (AID) of the agent accessing the cogran in the tracking_info field of the matched SFT entry.

17. The system of claim 15, wherein the computer process further comprising changing a valid bit corresponding to the agent accessing the cogran in the DVT entry's tracking vector to valid.

* * * * *